(12) United States Patent
Devaucelle (10) Patent No.: US 9,544,016 B2
(45) Date of Patent: Jan. 10, 2017

(54) POWER LINE COMMUNICATIONS USING FRAME CONTROL DATA BLOCKS FOR DATA TRANSPORT

(71) Applicant: MARVELL WORLD TRADE LTD., St. Michael (BB)

(72) Inventor: Christophe Devaucelle, Renens (CH)

(73) Assignee: Marvell World Trade Ltd., St. Michael (BB)

( * ) Notice: Subject to any disclaimer, the term of this patent is extended or adjusted under 35 U.S.C. 154(b) by 217 days.

(21) Appl. No.: 14/187,838

(22) Filed: Feb. 24, 2014

(65) Prior Publication Data

US 2014/0241441 A1    Aug. 28, 2014

Related U.S. Application Data

(60) Provisional application No. 61/768,699, filed on Feb. 25, 2013.

(51) Int. Cl.
H04B 3/54    (2006.01)

(52) U.S. Cl.
CPC .............. *H04B 3/54* (2013.01); *H04B 3/542* (2013.01); *H04B 2203/547* (2013.01); *H04B 2203/5408* (2013.01); *H04B 2203/5445* (2013.01)

(58) Field of Classification Search
CPC ... H04B 3/54; H04B 3/542; H04B 2203/5445; H04B 2203/547; H04B 2203/5408
See application file for complete search history.

(56) References Cited

U.S. PATENT DOCUMENTS

| 7,983,250 B2* | 7/2011 | Enders | H04L 12/40032 370/362 |
| 2007/0201540 A1* | 8/2007 | Berkman | H04B 3/542 375/219 |
| 2012/0139488 A1* | 6/2012 | Lee | H02J 3/1842 320/109 |

FOREIGN PATENT DOCUMENTS

WO    WO-03/021930 A1    3/2003

OTHER PUBLICATIONS

Benzi, et al., "Powerline Protocols—Review, evaluation and tests for automotive applications," *International Meeting on Powerline Communication for -but not limited to- Automotive*, University of Pavia, 47 pages (Nov. 4, 2008).

International Search Report and Written Opinion in corresponding PCT Application No. PCT/IB2014/000813, dated Jul. 30, 2014 (9 pages).

(Continued)

*Primary Examiner* — Thai Nguyen (57) ABSTRACT

Method, systems, and apparatus include a communication device configured to receive a data unit in accordance with a power line communications protocol, to extract data within the data unit to provide extracted data, and to process the extracted data in accordance with a non-power line communication protocol. Embodiments also describe a communication device configured to format data according to a non-power line communication protocol as part of a data unit conforming to a power line communication protocol, to redundantly encode the data unit across a plurality of subcarriers in accordance with the second communication protocol, and to transmit the data unit in accordance with the second communication protocol to another communications device.

24 Claims, 5 Drawing Sheets

(56) References Cited

OTHER PUBLICATIONS

International Preliminary Report on Patentability in International Application No. PCT/IB2014/000813, dated Aug. 25, 2015 (6 pages).
IEEE Std P1901™/D4.00 "Draft Standard for Broadband over Power Line Networks: Medium Access Control and Physical Layer Specifications," IEEE Computer Society, *The Institute of Electrical and Electronics Engineers, Inc.*, 1589 pages (Jun. 2010).

* cited by examiner

POWER LINE COMMUNICATIONS USING FRAME CONTROL DATA BLOCKS FOR DATA TRANSPORT

CROSS REFERENCE TO RELATED APPLICATION AND INCORPORATION BY REFERENCE

This application claims the benefit of U.S. Provisional Application No. 61/768,699, entitled "In-Car Communication based on Power Line Communications," and filed on Feb. 25, 2013, the disclosure of which is hereby incorporated herein by reference in its entirety.

FIELD OF THE DISCLOSURE

The present disclosure relates generally to communication networks and, more particularly, to methods and systems for using power line communication protocols to replace other types of communication protocols.

BACKGROUND

Vehicles continue to adopt more electronic devices in their design, which may provide sensor input, feedback, provide user controls, etc. Communications between these various devices is necessary to ensure their functionality. For example, diagnostic data is often monitored and recorded to provide a user feedback about the state of the engine. To provide another example, an onboard computer in an automobile often works in conjunction with various electromechanical devices such as door locks, window lifts, etc. Each of these various devices are referred to as "nodes" within a vehicle, and modern vehicles may be designed with a great number of such nodes (e.g., 100 or more).

To communicate with these nodes, a computer system and/or other type of central node is generally hardwired to each node via a series of buses and wiring harnesses. These wiring harnesses are typically non-standard for each manufacturer, requiring design time and adding cost. Furthermore, since a great number of nodes may exist in a given vehicle, the wiring harnesses and cabling forming these bus interconnects can add substantial vehicle weight, which directly impacts fuel efficiency. As a result of increasing consumer demand for vehicles with more modern electronic features, continuing to lower manufacturing costs while increasing fuel efficiency presents serious challenges.

SUMMARY OF THE DISCLOSURE

Method, systems, and apparatus are described that enable transport of non-power line protocol data as part of a power-line protocol data transport. Since power line communications implement redundant encoding of frame control blocks, using the redundantly-encoded frame control blocks for data transport provides for robust communications. Furthermore, since power lines are already used at nodes utilizing power line communications, additional communication protocols can be transported within the power line communication frame control blocks without the need for additional wiring, thereby saving weight and costs.

In an embodiment, a method performed by a communication device includes receiving a data unit in accordance with a power line communications protocol, extracting data within the data unit to provide extracted data, and processing the extracted data in accordance with a non-power line communication protocol.

In another embodiment, a communication device includes a network interface that is configured to receive a data unit in accordance with a power line communications protocol, extract data within the data unit to provide extracted data, and to process the extracted data in accordance with a non-power line communication protocol.

In yet another embodiment, a method performed by a communication device includes formatting data according to a non-power line communication protocol as part of a data unit conforming to a power line communication protocol, redundantly encoding the data unit across a plurality of subcarriers in accordance with the second communication protocol, and transmitting the data unit in accordance with the second communication protocol to another communications device.

In an additional embodiment, a communication device includes a network interface device configured to format data according to a non-power line communication protocol as part of a data unit conforming to a power line communication protocol, redundantly encode the data across a plurality of subcarriers in accordance with the second communication protocol, and transmit the data unit in accordance with the second communication protocol.

DETAILED DESCRIPTION

Figure 1:
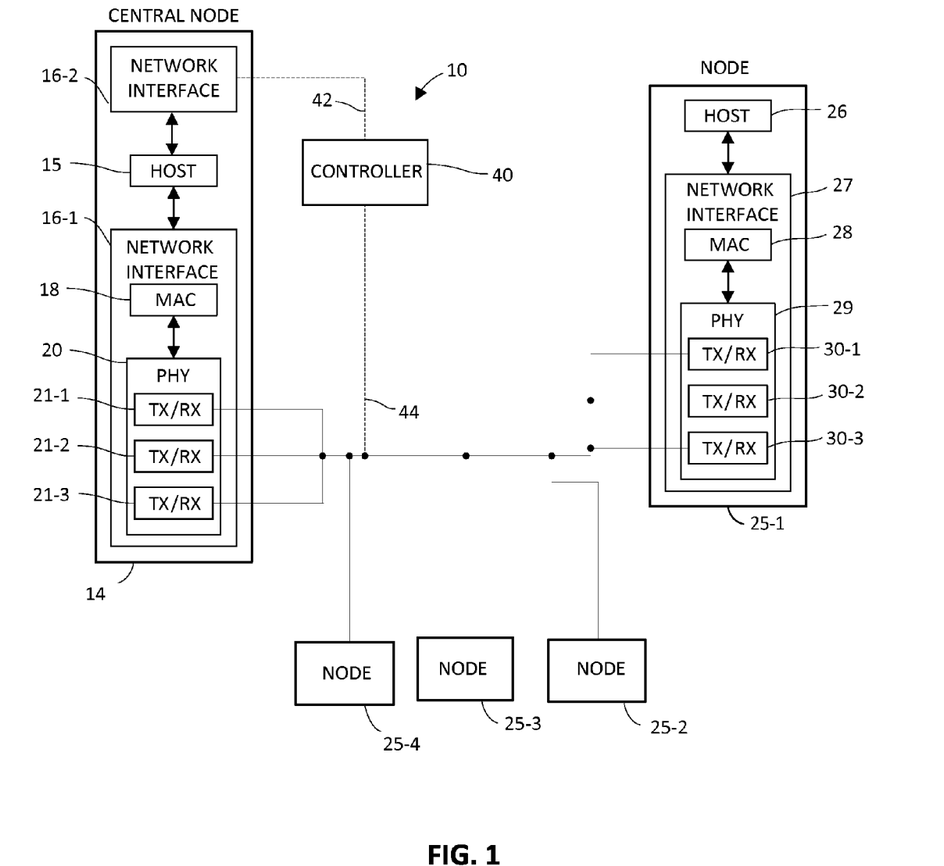
FIG. 1 is a block diagram of an example network 10, in accordance with an embodiment of the present disclosure.

FIG. 1 is a block diagram of an example communication network 10 in accordance with an embodiment of the present disclosure. Network 10 includes a central node 14, a controller 40, and nodes 25.

Central node 14 includes a host processor 15 coupled to a network interface 16-1 and a network interface 16-2. Network interface 16-1 includes a medium access control (MAC) unit 18 and a physical layer (PHY) unit 20. PHY unit 20 includes a plurality of transceivers 21, which are coupled to bus 44. As will be appreciated by those of skill in the art, although three transceivers are illustrated in FIG. 1, various embodiments of central node 14 can include any suitable number (e.g., 1, 2, 4, 5, etc.) of transceivers 21. Network interface 16-2 has a similar structure as network interface 16-1, i.e., with a corresponding MAC unit, PHY unit, and one or more transceivers, in an embodiment. In some embodiments, network interface 16-1 and network interface 16-2 correspond to different network communication protocols. In accordance with these embodiments, network interface 16-2 is coupled to controller 40 via bus 42.

Although four nodes 25 are illustrated in FIG. 1, various embodiments of network 10 include any suitable number (e.g., 1, 2, 3, 5, 6, . . . , 100, . . . , 200, 300, . . . , etc.) of nodes 25. A node 25-1 includes a host processor 26 coupled to a network interface 27. Network interface 27 includes a MAC processing unit 28 and a PHY processing unit 29. PHY processing unit 29 includes one or more transceivers 30, which are coupled to bus 44. Although three transceivers 30 are illustrated in FIG. 1, various embodiments of node 25-1 can include any suitable number (e.g., 1, 2, 4, 5, etc.) of transceivers 30.

In accordance with various embodiments of the present disclosure, any suitable number of nodes 25 has a structure the same as or substantially similar to node 25-1. In accordance with such embodiments, nodes 25 structured the same as or substantially similar to node 25-1 include any suitable number of transceivers and network interfaces. For example, although node 25-1 is illustrated as having three transceivers 34 and a single network interface 27, various embodiments of nodes 25 have two transceivers and two network interfaces, etc. The number of network interfaces and transceivers associated with nodes 25-2, 25-3, and 25-4 is not shown in FIG. 1 for purposes of brevity.

In some embodiments, controller 40 is coupled to network interface 16-2 via bus 42 and to network interface 16-1 and nodes 25 via bus 44. In other embodiments, controller 40 is connected to either network interface 16-1 and nodes 25 via bus 44 or to network interface 16-2 via bus 42, as indicated by the dashed lines in FIG. 1. In other embodiments, controller 40 and central node 14 as integrated as part of a single device. In embodiments in which central node 14 is coupled to both nodes 25 and controller 40, central node 14 can act as a bridge between nodes 25 and controller 40.

Network 10 supports communications in accordance with any number of suitable communication protocols, such as wired networking protocols, communication protocols specified by one or more IEEE standards, etc. Examples of suitable IEEE standards include 1901 protocols. Examples of wired networking protocols include any suitable serial or parallel communication protocol, or a combination of parallel and serial protocols. Examples of suitable wired communication protocols include local interconnect network (LIN) protocols and controller area network (CAN) protocols. Although FIG. 1 illustrates only a single central node 14 and controller 40, various embodiments of nodes 25 are configured to communicate with more than a single central node and/or controller at any time, including simultaneous communications with separate central nodes and/or controllers using communication protocols that may be the same or different from one another.

In accordance with an embodiment of the present disclosure, central node 14, controller 40, and/or nodes 25 are implemented as communication devices and are configured to transmit and receive data with one another conforming to one or more suitable communication protocols and/or IEEE communication protocol standards.

In accordance with various embodiments, network 10 is implemented as part of a vehicle, such as an automobile, an aircraft, a boat, etc. In accordance with other embodiments, network 10 is implemented as part of any suitable wired network and is not implemented in a vehicle.

In accordance with vehicular embodiments, controller 40 is configured to monitor functions associated with the vehicle, manage vehicular operations, and/or provide feedback to an operator of the vehicle. For example, controller 40 may be a part of an automobile computer. Further in accordance with such embodiments, nodes 25 are configured to collect data and to report this data to central node 14 and/or to controller 40. For example, nodes 25 may include or be coupled to associated sensors and/or actuators such as velocity sensors, accelerometers, temperature sensors, pressure sensors, chemical sensors, airbag sensors, actuators used in a vehicle engine, power window actuators, door lock actuators, power mirror motors, power seat motors, etc. In accordance with various embodiments, nodes 25 respond to requests received from central node 14 and/or controller 40. For example, if node 25-1 is a velocity sensor, central node 14 and/or controller 40 may send a request to node 25-1 for velocity data, which in is then returned to central node 14 and/or controller 40 via bus 44. In other embodiments, at least some nodes 25 provide information to central node 14 and/or controller 40 without the central node 14 and/or controller 40 first requesting the information.

In accordance with non-vehicular embodiments, controller 40 is configured to monitor functions associated with the device in which network 10 is implemented, such as a home network, for example. Further in accordance with such embodiments, nodes 25 are configured to collect data and to report this data to central node 14 and/or to controller 40. In accordance with various embodiments, nodes 25 respond to requests received from central node 14 and/or controller 40. For example, if node 25-1 includes or is associated with a temperature sensor, central node 14 and/or controller 40 may send a request to node 25-1 for temperature data, which in is then returned to central node 14 and/or controller 40 via bus 44. In other embodiments, at least some nodes 25 provide information to central node 14 and/or controller 40 without the central node 14 and/or controller 40 first requesting the information.

In accordance with an embodiment, central node 14 communicates with nodes 25 via bus 44 to send and receive data to/from nodes 25, and controller 40 communicates with central node 14 via bus 42 and/or bus 44 to send and receive data from central node 14. In some embodiments, bus 44 is included in or implemented as power lines that provide power to nodes 25. In an embodiment, bus 44 is implemented as power lines having no other separate communication medium such as wires that do not deliver power. In such embodiments, any of central node 14, nodes 25, and/or controller 40 is configured to communicate with one another via bus 44 in accordance with one or more power line communication's (PLC) protocols.

In accordance with an embodiment, network interface 16-1 and/or processor 15 is configured to format data to be transmitted conforming to a first communication protocol within a data unit that is then transmitted in accordance with a second communication protocol. In accordance with such embodiments, a network interface of node 25 receiving the transmitted data, such as network interface 27 of node 25-1, for example, is configured to receive the data in accordance with the second communication protocol. Continuing this example, once the data is received in accordance with the second communication protocol, network interface 27 is configured to determine whether the data unit includes data corresponding to the first communications protocol. If network interface 27 and/or processor 15 determine that the data unit includes data corresponding to the first communications protocol, then the data within the data unit is extracted and processed in accordance with the first communications protocol by network interface 27 and/or processor 15.

In accordance with some embodiments, central node 14 is configured to format the data to be transmitted in accordance with a first communications protocol by generating one or more data type identifiers, headers, and/or any other suitable identifiers within the data unit. In accordance with such embodiments, the corresponding network interface and/or processors of each node 25 (e.g., network interface 27 and/or processor 26) is configured to extract and process the data in accordance with the first communications protocol to recover the data once the data is identified according to the identifier generated by central node 14. Further in accordance with such embodiments, the network interface and/or processor of the corresponding node 25 is configured to process the data unit in accordance with the second communications protocol if the identifier is not found within the data unit.

In accordance with an embodiment, the corresponding network interface and/or processors of the recipient node, such as a node 25, for example, is configured to store the data in a memory and/or queue for subsequent processing. Such a memory is implemented as a part of the corresponding network interface and/or a processor of the recipient node, in some embodiments. As will be appreciated by those of skill in the relevant art(s), although various embodiments of the present disclosure describe extraction and processing at one of nodes 25, network interfaces and/or processors of central node 14 and 25 are each configured to extract and process data received from one another.

Once the data is processed, the network interface and/or processor of recipient nodes 25 is configured to similarly format a response that is in accordance with the first communications protocol within a data unit that is transmitted in accordance with the second communications protocol, along with any suitable data type identifiers, headers, and/or any other suitable identifiers within the data unit, in some embodiments. Central node 14 is likewise configured to receive the response in accordance with the second communication protocol and to process the data in accordance with the first communications protocol to recover the data once the data is identified according to the identifier generated by the sending node.

In this way, network 10 eliminates dedicated buses associated with the first communication protocol by formatting data (that would otherwise be transmitted and received via such dedicated buses) for communication via existing power lines in accordance with the second communication protocol (e.g., PLC), in accordance with an embodiment. Since central node 14 and nodes 25 require power to perform their associated functions, using a PLC protocol with existing power lines eliminates the need for additional wired buses and wiring harnesses, thereby saving costs. In accordance with vehicular embodiments, the elimination of these buses and wiring harnesses also results in reduced vehicle weight and better fuel economy.

In accordance with some embodiments, central node 14 has substantially similar functionality as nodes 25. For example, in accordance with such embodiments, central node 14 and nodes 25 may send requests to one another and receive associated responses, data, etc. In accordance with other embodiments, central node 14 has additional functionality and/or processing power compared to nodes 25.

In accordance with some embodiments, central node 14 is configured to coordinate and/or schedule communications between nodes 25. In accordance with other embodiments, central node 14 is configured to communicate with nodes 25 as directed by controller 40. For example, in accordance with scheduling embodiments, central node 14 is configured to coordinate communications between nodes 25 and to send requests for data to nodes 25 in accordance with a schedule, which optionally is periodic or aperiodic. Further in some embodiments that utilize a schedule, nodes 25 are configured to transmit in accordance with the schedule. Central node 14 is optionally configured to tailor the communications schedule based on an implementation of each particular node. As will be appreciated by those of skill in the relevant art(s), more frequent requests for data may be desired from some of nodes 25 as compared to others. For example, if node 25-4 is implemented as part of a GPS system whereas node 25-3 is implemented as part of an engine sensor, central node 14 may schedule data requests from node 25-3 more frequently than node 25-4.

In accordance with controller-directed embodiments, central node 14 may receive instructions and/or commands from controller 40 to request data from nodes 25. Controller 40 optionally commands central node 14 to send the data requests to nodes 25 in accordance with a schedule or on an interrupt-driven basis. For example, controller 40 optionally instructs central node 14 to collect data from nodes 25 as part of a periodic or aperiodic schedule. To provide another example, controller 40 optionally commands central node 14 to collect data from one or more nodes 25 in response to a user input. A user input might include pressing a physical button, for example, triggering a command to be sent from central node 14 to one of nodes 25 for actuation of an electromechanical switch whereby feedback is returned by the corresponding node regarding a state of the switch once actuated.

As will be appreciated by those of skill in the art, network communications within vehicles commonly use CAN and LIN protocols. Common LIN protocol data rates are 9.6 Kbits/second and 19.2 Kbits/second. LIN protocols are generally used in automotive systems when high speed data is not vital. For example, common applications of the LIN protocol include window lifts, lights, mirror commands, etc. Common CAN protocol data rates are 100 Kbits/second and 500 Kbits/second. CAN protocols are generally used in automotive systems when high speed data is more crucial. For example, common applications of the CAN protocol include engine data, GPS data, speed data, automatic braking system (ABS) data, airbag data, etc.

Various vehicular embodiments of network 10 include eliminating LIN or CAN buses but maintaining at least some LIN and/or CAN communication functions between central node 14 and nodes 25 and/or between nodes 25. In such embodiments, bus 44 is used for power line communications and LIN and/or CAN data is formatted within one or more data units as part of a PLC protocol. In accordance with such embodiments, central node 14 and nodes 25 are configured to optionally implement the IEEE 1901 PLC protocol or to implement one or more modified versions of the IEEE 1901 protocol, as discussed in more detail below.

Figure 2A:
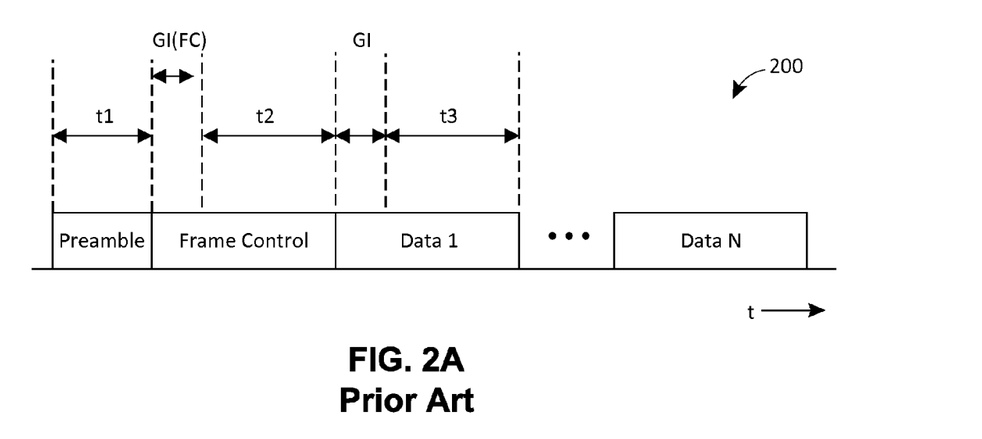
FIG. 2A is a block diagram of a power line communications (PLC) medium access control (MAC) protocol data unit (MPDU) 200 having a long type format as is known in the art.

FIG. 2A is a block diagram of a power line communications (PLC) medium access control (MAC) protocol data unit (MPDU) 200 having a long type format as is known in the art. The long type format MPDU is used to exchange data between communication devices operating in accordance with the IEEE 1901 standard. In accordance with the IEEE 1901 standard, the preamble is an orthogonal frequency domain multiplexing (OFDM) symbol that is defined on 256 subcarriers and repeated 10 times (9 if the preamble is part of a hybrid frame). The preamble includes time synchronization information and coarse channel estimation to allow for demodulation of the subsequent frame control block. The frame control block is typically encoded with a low-order modulation on each subcarrier, such as quadrature-phase shift keying (QPSK). Once the frame control block is demodulated, the frame control block is re-encoded and re-modulated to provide improved channel estimation. The improved channel estimation allows for the demodulation of subsequent data which may be mapped with a higher-order modulation. The subsequent data blocks 1 through N following the frame control block constitute the data payload.

The preamble, frame control block, and data payload constituting MPDU 200 are each associated with a symbol transmission period. For example, an OFDM preamble has a 5.12 micro-second (µs) time period, and time period t1 is typically defined as this symbol period times the number of repeated OFDM symbols in the preamble (e.g., a 51.2 µs for a preamble repeated 10 times). To provide another example, the OFDM symbol time period is 40.96 µs for the frame control and the payload.

The period of the frame control block is defined by a frame control guard interval, GI(FC), and an inverse fast Fourier transform (IFFT) interval t2. The GI(FC) is typically fixed at 18.32 µs in accordance with the 1832 time samples specified in the IEEE 1901 standard. Furthermore, the IFFT interval is typically fixed at 40.96 us in accordance with the 4096 time samples specified in the IEEE 1901 standard. Therefore, the overall period of the frame control block is typically 59.28 µs.

The period of each data block 1 through N is defined by a payload guard interval, GI, plus an IFFT interval t3. For the payload, the GI increases with the number of samples in the transmitted payload data. Typical values for the GI vary from 5.56 µs, 7.56 µs, and 47.12 µs, corresponding to sample sizes of 556, 756, and 4712, respectively. Therefore, a period of any of data blocks 1 though N may be 46.52 µs, 48.52, or 88.15 µs, corresponding to each of the respective GIs.

Figure 2B:
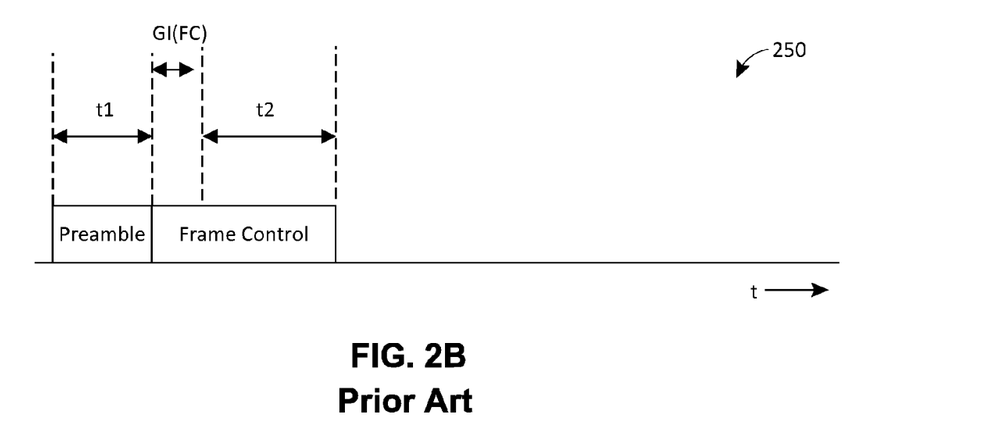
FIG. 2B is a block diagram of a PLC MPDU 250 having a short type format as is known in the art.

FIG. 2B is a block diagram of a PLC MPDU 250 having a short type format as is known in the art. The short type MPDU is used for generic commands within the IEEE 1901 standard. For example, a communication device implementing the IEEE 1901 protocol may send a preamble and frame control block to acknowledge receipt of data received in a long type format MPDU. The short type format MPDU frame control block includes several bytes that include respective fields, which will be further discussed in reference to FIG. 3. For example, in the IEEE 1901 standard, a frame control block including a three-bit delimiter type field (DT_IH) value of 2 indicates to a communication device receiving the short format MPDU that the frame control block data is a selective acknowledge (SACK) response. IEEE 1901 protocol also defines an interframe space (IFS) time period between receiving a long type format MPDU and responding with a SACK in a short type format MPDU to avoid data contention. In accordance with IEEE 1901 standards, delimiter type values corresponding to 6 and 7 are reserved and are not assigned to a particular command or function.

Figure 3:
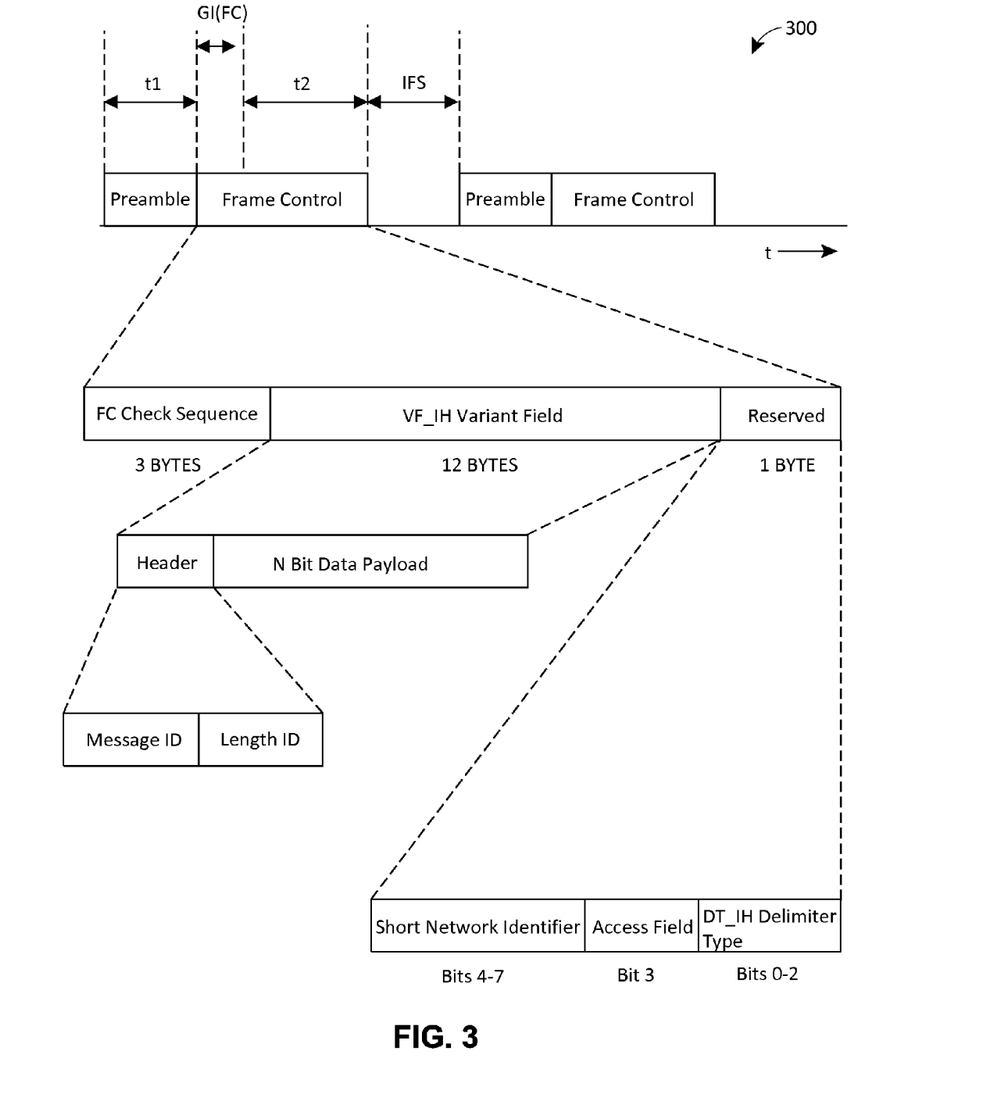
FIG. 3 is block diagram of an example PLC MPDU 300, in accordance with an embodiment of the present disclosure.

FIG. 3 is block diagram of a PLC MPDU 300 in accordance with an embodiment of the present disclosure. PLC MPDU 300 includes a preamble and frame control block. In accordance with an embodiment, the frame control data block is utilized for data transport, and the MPDU 300 omits a payload field.

The frame control block is a 16 byte field and includes 1 reserved byte, 12 bytes for a variant field VF_IH, and 3 bytes for a frame control check sequence. The reserved byte includes 3 bits for a delimiter type field DT_IH, one bit for an access field, and 4 bits for a short network identifier field. In accordance with an embodiment, these fields correspond to those used in the IEEE 1901 protocol. In accordance with such embodiments, the delimiter type field values of 6 and 7 are reserved.

In an exemplary embodiment, network interface 16-1 is configured to format data in accordance with a communication protocol that is not a PLC protocol and place the formatted data within the variant field illustrated of FIG. 3. For example, in an embodiment, network interface 16-1 is configured to format data according to a CAN or LIN protocol as part of the 12 bytes of data constituting the variant field of FIG. 3. The corresponding network interface and/or processor implemented as part of central node 14 and/or nodes 25 is configured to optionally generate a data type indicator field and/or suitable identifier to signal the recipient node that the frame control block includes data formatted according to a CAN or LIN protocol, in an embodiment.

In various embodiments, a corresponding network interface and/or processor implemented as part of central node 14 and/or nodes 25 is configured to generate the delimiter type field DT_IH having a value of 6 or 7 to provide an indication to a recipient node. Since these values are reserved in the IEEE 1901 protocol, central node 14 and nodes 25 may use this value without otherwise affecting IEEE 1901 communications. In accordance with an embodiment, central node 14 and/or nodes 25 process MPDU 300 in accordance with the IEEE 1901 protocol when the delimiter field value is a value other than 6 or 7, as indicated by the IEEE 1901 protocol values corresponding to the delimiter field values.

For example, a delimiter field value of 2 would indicate to central node 14 and/or nodes 25 to treat the frame control block data as a SACK. Assuming that a node is configured to communicate only in accordance with IEEE 1901 standards, e.g., is not capable of extracting and processing data within the frame control block such as described herein, and such a node receives a frame control block with a delimiter field value of 6 or 7, the node would ignore the contents of the frame control block since the IEEE 1901 protocol reserved values are not associated with a frame control block data type. In this way, a system can include some nodes that recognize the delimiter field value of 6 or 7 and some nodes that do not. Therefore, in some embodiments, new nodes that are configured to recognize delimiter field values of 6 or 7 can be added to a system without requiring modifications to existing nodes that do not. As will be appreciated by those or skill in the relevant art(s), in some embodiments, nodes 25 configured to operate only in accordance with IEEE 1901 protocols can be adapted to utilize communication techniques as described throughout the disclosure by changing the PHY layer and/or reprogramming the associated PHY firmware and/or PHY controller.

In addition to the delimiter field values generated by a corresponding network interface and/or processor implemented as part of central node 14 and/or nodes 25, additional data can optionally be generated and placed at the start of the variant field as a header in accordance with various embodiments, as shown in FIG. 3. Further in accordance with these embodiments, central node 14 and/or nodes 25 are configured to generate the header within the 12 byte variant field, leaving the remaining space for data corresponding to another communications protocol other than the PLC protocol. For example, in accordance with an embodiment, the header includes information identifying a link between the transmitting node (e.g., the central node) and the receiving node (e.g., node 25-1). As another example, in accordance with an embodiment, the header includes a message identifier. Further in accordance with an embodiment, the header optionally includes a length identifier that identifies the length of the transmitted message.

In accordance with various embodiments, the message identifier includes any suitable number of bits to facilitate identification of the transmitting node, such as a unique address, a MAC address, etc. The length identifier includes any suitable number of bits to facilitate identification of the length of the transmitted message within one or more variant fields. In accordance with an embodiment, the header includes 2 bytes of data, with 12 bits constituting the message ID field and 4 bits constituting the length identification field. In accordance with this embodiment, 10 bytes of the variant field's 12 bytes remain to be used as a "payload" for data transmissions corresponding to communication protocols other than the PLC protocol.

In accordance with an embodiment, the header is transmitted by the central node 14, and by nodes 25 when responding to requests from central node 14. In accordance with other embodiments, only central node 14 transmits the header in transmissions to nodes 25. In embodiments in which central node 14 sends transmissions to nodes 25 in accordance with a schedule, central node 14 does not require a message ID to be included in a header in the response from nodes 25. That is, central node 14 is configured to identify the responding node 25 since central node 14 is aware of which node the transmission was sent and whether the response was received within the scheduled time slot. However, correlation between time slots and nodes can require additional processing time and/or a search of a memory implemented within network interface 16-1 and/or processor 15. Therefore, the header may optionally be included in responses sent by nodes 25, for example, to reduce firmware complexity, to provide valuable data for debugging purposes, etc. As will be appreciated by those of skill in the relevant art(s), the convenience and/or reduction in complexity as a result of a decision to transmit the header by nodes 25 can be weighed against a potential loss in data rate based on the particular application.

In accordance with various embodiments, a plurality of MPDUs 300 may be transmitted by central node 14 and/or nodes 25 to facilitate transport of data formatted according to suitable communication protocols other than PLC. For example, if a data unit corresponding to the non-PLC protocol is longer than the available remaining bytes in the variant field, then the length identification field can optionally indicate the length of the data unit to facilitate processing of multiple MPDUs. For example, if a non-PLC data unit is 14 bytes in length, the data length identifier can indicate the 14-byte length. Once the MPDU 300 is received at a corresponding node, that node can use the length identification field to determine whether to expect additional MPDUs 300 containing the remainder of the 14 byte message. In accordance with an embodiment, the length identification field in a header of the subsequent frame control block optionally includes an updated length value indicating the remaining data. In accordance with another embodiment, headers of subsequent frame control blocks optionally include a fixed length identification field repeating the initial length value in each subsequent frame control block. In accordance with fixed length identification field embodiments, the receiving node is configured to count frame control blocks to determine when the entire non-PLC data unit has been delivered.

In accordance with various embodiments, the length identification field alternatively includes or is replaced with an indication of whether subsequent frame control blocks are to follow. For example, the length identification field includes or is replaced by a single bit field, with a logical value of "0" indicating the present frame control block is the last one to be transmitted, and a logical value of "1" indicating that an additional frame control block is to be expected, in some embodiments. Embodiments using a single bit logical value may be advantageous to further decrease the header size to reserve additional space in the variant field for the data payload.

In accordance with an embodiment, central node 14 acts as a LIN master device and nodes 25 act as LIN slave devices, as the LIN protocol implements a master-slave coordination. Furthermore, the LIN protocol includes a header message sent from the master device (central node 14) that contains 34 bits constituting a LIN data request. In accordance with this embodiment, central node 14 formats the 34 bit header within the frame control block of MPDU 300, adding the header field, as shown in FIG. 3, with the message and length ID fields. Further in accordance with this embodiment, central node 14 also generates the DT_IH delimiter type field value to a reserved value, such as 6, for example, and then transmits MPDU 300 using a modified version of the IEEE 1901 protocol.

Further in accordance with some embodiments, a node 25 receives the MPDU 300 sent from central node 14 and verifies it is the recipient of MPDU 300 based on the data contained in the message ID field. The receiving node then processes the frame control block data and determines that the frame control block includes a LIN message based on the DT_IH value being equal to 6. Once this determination is made, the recipient node 25 extracts the 36 bit LIN header and processes it in accordance with the LIN protocol.

Further in accordance with this embodiment, once the 36 bit LIN header is extracted and processed at the recipient node, a response is generated for transmission back to the central node 14. In accordance with LIN protocol, the slave device responds to the 34 bit header message with a 1-8 byte payload and a 1 byte checksum. In addition, the LIN protocol surrounds each payload byte and the checksum byte with start and stop bits for flow control. As a result, a LIN response will include between 20-90 bits corresponding to 1-8 byte payloads.

In embodiments in which the recipient node does not include a header in the response to the central node, the maximum 90 bits fit within the 12 byte frame control block. In accordance with these embodiments, the recipient node generates the DT_IH delimiter type field value having a reserved value, such as 6, for example, and sends the MPDU back to central node 14 with a frame control block including the LIN response data.

In embodiments in which the recipient node generates a header in response to the central node, the maximum 90 bits may not fit within the 12 byte frame control block. In such embodiments, multiple MPDUs may be sent from the recipient node and the length ID field optionally used to indicate that multiple MPDUs are sent containing the LIN response data.

Similar to the recipient node, control node 14 receives the one or more MPDUs, processes the frame control blocks, verifies the DT_IH delimiter type field value, extracts the LIN response data within one or more frame control blocks, and processes the LIN response data in accordance with the LIN protocol. If more than one MPDU is sent to control node 14, then control node 14 optionally extracts and processes LIN response data within each frame control block of multiple MPDUs using the length ID field as previously discussed in regards to the embodiments of nodes 25.

In accordance with an embodiment, central node 14 acts as one master device and one or more nodes 25 act as additional master devices such as according to a multi-master coordination system specified by the CAN protocol. The CAN protocol includes a 0-8 byte payload and a maximum frame length of 108 bits. The CAN protocol also provides for a 128 bit extended frame format. For example, central node 14 formats the payload within the frame control block of MPDU 300, adding the header field, as shown in FIG. 3, with the message and length ID fields. Similar to the LIN protocol example, central node 14 also generates the DT_IH delimiter type field value to a reserved value, such as 6, for example. Further in accordance with this embodiment, central node 14 then transmits the MPDU in accordance with IEEE 1901 protocol.

Further in accordance with CAN embodiments, a node, such as node 25-1, for example, receives the MPDU sent from central node 14 and verifies it is the recipient of MPDU 300 based on the data contained in the message ID field. The receiving node then processes the frame control block data and determines that the frame control block includes a CAN message based on the DT_IH value being equal to 6. Once this determination is made, the recipient node extracts the CAN message from the frame control block and processes the CAN message data in accordance with the CAN protocol.

As previously discussed with regards to the LIN protocol embodiment, data messages larger than the available space in the frame control block can be addressed with multiple MPDUs using the length indication field in a generated header. Similar to the LIN protocol example, in a CAN embodiment, central node 14 and/or nodes 25 likewise format CAN data within one or more frame control blocks, indicate this with an appropriate DT_IH field value, and extract and process the CAN message data in accordance with the CAN protocols.

By using the frame control block for data transport as discussed above, various embodiments of the present disclosure decrease latency between data communications by eliminating a payload. Additionally, in some embodiments, MPDUs such as the MPDU 300 do not require the receiving device to transmit an acknowledgment of the MPDU, thus further decreasing latency as well as traffic. In an embodiment, central node 14 and/or nodes 25 are configured to use the frame check sequence in the frame control block, as shown in FIG. 3, to verify correct demodulation and decryption of the frame control block. The frame check sequence could include, for example, a cyclic redundancy check (CRC) value. In accordance with an embodiment, the frame control check sequence is calculated as specified in the IEEE 1901 protocol. As discussed above, in accordance with an embodiment, no acknowledgments are sent from central node 14 or nodes 25 in response received transmissions. Rather, in accordance with various embodiments, central node 14 and/or nodes 25 verify the frame control block using the frame control check sequence and then respond to received transmissions with another MPDU 300 including requested data within the frame control block.

In addition, although an IFS shown in FIG. 3 is present to avoid data contention between exchanges of MPDUs, this IFS can be reduced from the IFS required in accordance with the IEEE 1901 standard in embodiments in which no ACKs are sent. As a result, the IFS is limited only by transceiver latency. Therefore, the combination of eliminating the use of long type format MPDUs and reducing the IFS provides for faster data rates than those supported in the IEEE 1901 standard. For example, if t1 is 51.12 µs, GI(FC) is 18.32 µs, and t2 is 40.96 µs, then the total symbol period associated with receiving 12 bytes of data within the VF_IH field is 110.48 µs. In this example, the data rate can be expressed in Eqn. 1 as follows:

$$\text{Data Rate} \left(\frac{\text{Kbits}}{\text{sec}}\right) = \frac{96 \text{ bits}}{110.48 \text{ µs} + IFS} \quad \text{Eqn. 1}$$

As the IFS approaches zero, this results in a data rate maximum based on Eqn. 1 of 868.93 Kbits/sec. Since LIN and CAN protocol data rates are less than this data rate (e.g., CAN maximum data rate is 500 Kbits/sec) the various embodiments described throughout this disclosure are well suited for applications to which the LIN and CAN protocols are directed.

In accordance with various embodiments, the data rate can be further increased by exploiting the data formatting process. For example, some communication protocols, such as LIN, pad data bytes with start and/or stop bits. In accordance with an embodiment, central node 14 and/or nodes 25 are configured to reformat LIN data for transmission via the MPDU 300 by removing these start and/or stop bits. For example, a typical 90 bit LIN response includes an 8 byte payload, a 1 byte checksum, and 18 start/stop bits.

In accordance with an embodiment, central node 14 and/or a client 25 is configured to remove such start/stop bits prior to including the data in the frame control field, thereby reducing the amount of transmitted data in the 90-bit example above to 72 bits, resulting in an overall reduction in size of 20%. In an embodiment, an indication of whether the start/stop bits have been removed is optionally included, for example, in the header information transmitted. For example, a formatting field is included in the header, as shown in FIG. 3 in addition to, or as a part of, the message ID and/or length ID fields. Once a recipient node receives the MPDU, the formatting field is utilized to determine if the start/stop bits have been removed. In an embodiment, if the formatting field indicates that the start/stop bits have been removed, the recipient node inserts the start/stop bits so the extracted LIN data can then be processed in accordance with the LIN protocol. In accordance with an embodiment, reintroduction of start/stop bits could be implemented, for example, as a bit parsing system that counts every 8 bits and then formats the 8 bits by adding the start/stop bits to each extracted data byte prior to processing.

In some embodiments, redundant encoding of the frame control block is utilized. For example, a frame control block is redundantly encoded over a plurality of subcarriers within a broadcast mask to mitigate data corruption. For example, in an embodiment, a frame control block is encoded over 917 subcarriers over a broadcast mask of 2-30 MHz. In an embodiment, a turbo convolutional encoder is utilized to encode a 16 byte frame control block with 256 bits, the encoded bits are interleaved, and a diversity copier is utilized to spread the interleaved encoded frame control bits over the 917 subcarriers.

In accordance with various embodiments, the corresponding network interface and/or processor of central node 14 and/or nodes 25 are configured to redundantly encode the data that has been formatted within the frame control block across a plurality of subcarriers. Further in accordance with such embodiments, the corresponding network interface and/or processor of central node 14 and/or nodes 25 are configured to decode the redundant frame control blocks to recover the transmitted frame control block. Since existing IEEE 1901 protocol utilizes redundant frame control block encoding and decoding techniques, at least portions of existing IEEE network interfaces and processor, such as PHY layer firmware, can be utilized, in some embodiments. Similarly, redundant encoding and decoding could be implemented in various embodiments using existing IEEE 1901 hardware (e.g., turbo convolutional encoders, interleavers, diversity copiers, etc.) Redundant frame control block embodiments are particularly useful when network 10 is operating in a high electrical noise environment such as a vehicle, since communications utilizing redundant encoding techniques provide greater immunity and robustness in noisy environments.

Figure 4:
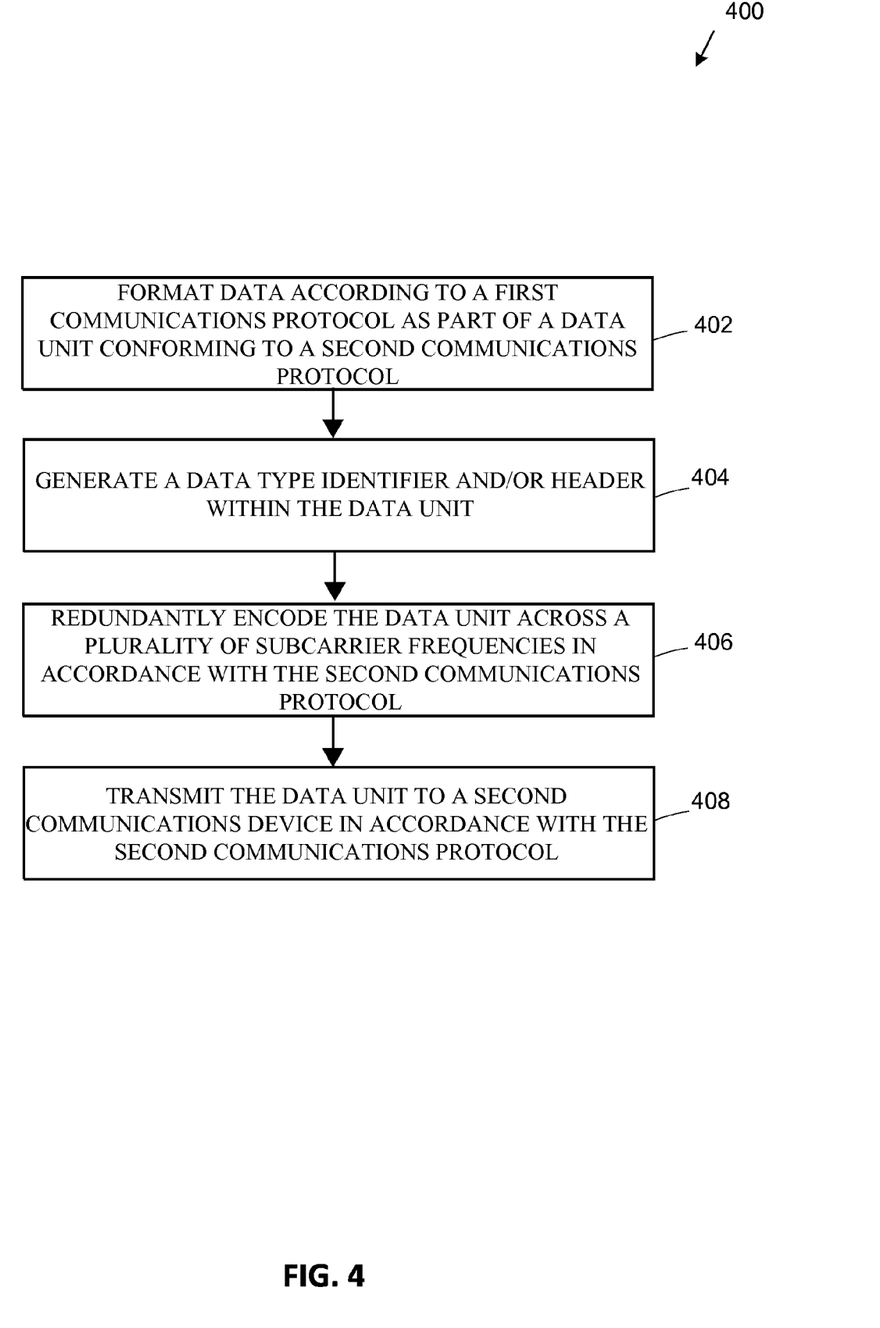
FIG. 4 is a flow diagram of an example PLC method 400, in accordance with an embodiment of the present disclosure.

FIG. 4 is a flow diagram of an example method 400 for transmitting data in accordance with an embodiment of the present disclosure. In an embodiment of the present disclosure, method 400 is performed in a suitable communication device, such as one or more of central node 14 and/or node 25-1, as shown in FIG. 1. FIG. 4 is discussed with reference to FIG. 1 for illustrative purposes. In other embodiments, however, the method 400 is implemented by a suitable communication device other than the devices in FIG. 1.

At block 402, a first communication device formats data according to a first communications protocol as part of a data unit conforming to a second communications protocol. The first communication device corresponds to central node 14, for example. The data unit includes, for example, a frame control block as shown in FIG. 3, in an embodiment. The first and second communication protocols include, for example, a serial interconnect protocol and a PLC protocol, respectively, in an embodiment. In accordance with various embodiments, the serial interconnect protocols include LIN and/or CAN protocols, and the PLC protocol includes a modified version of the IEEE 1901 protocol, in some embodiments.

At block 404, the first communication device generates a data type identifier and/or a header within the data unit. This data type identifier includes, for example, an identification indicating that the data block includes formatted data conforming to the first communications protocol, in an embodiment. In accordance with an embodiment, the data type identifier is a DT_IH delimiter type field that is set to a value to provide the indication of data conforming to the first communications protocol. The header includes, for example, a message identification and/or length identification as shown in FIG. 3, in an embodiment.

At block 406, the first communication device redundantly encodes the data unit across a plurality of subcarrier frequencies in accordance with the second communications protocol. In an embodiment, this data unit is redundantly encoded over a plurality of subcarriers in accordance with the IEEE 1901 protocol.

At block 408, the first communication device transmits the data unit to a second communications device in accordance with the second communications protocol. The second communications device could include, node 25-1 as shown in FIG. 1, for example.

Figure 5:
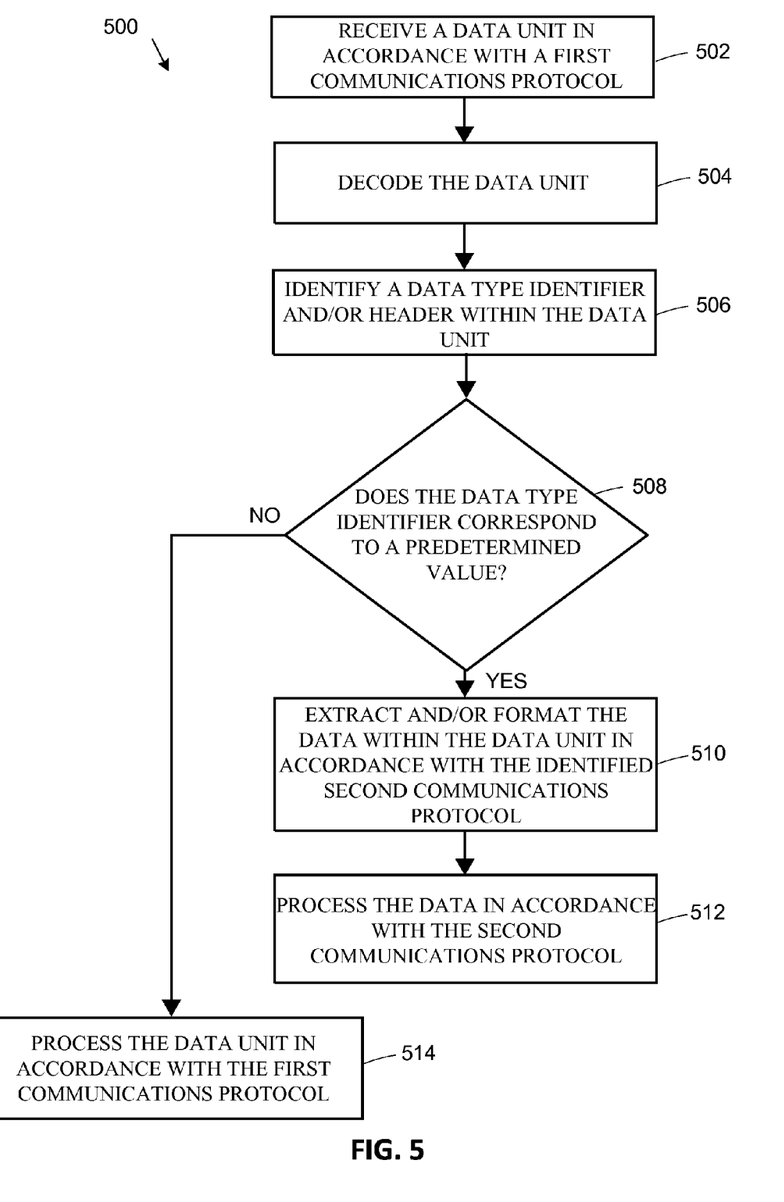
FIG. 5 is a flow diagram of an example PLC method 500, in accordance with an embodiment of the present disclosure.

FIG. 5 is a flow diagram of an example method 500 for receiving and processing data in accordance with an embodiment of the present disclosure. In an embodiment of the present disclosure, method 500 is performed in a suitable communication device, such as one or more of central node 14 and/or node 25-1, as shown in FIG. 1. FIG. 5 is discussed with reference to FIG. 1 for illustrative purposes. In other embodiments, however, the method 500 is implemented by a suitable communication device other than the devices in FIG. 1.

At block 502, a communication device receives a data unit in accordance with a first communications protocol. The communication device includes, for example, node 25-1, in an embodiment. The data unit includes, for example, a frame control block, as shown in FIG. 3, sent from central node 14, as shown in FIG. 1, in an embodiment. The first communication protocol includes, for example, a PLC protocol. In accordance with an embodiment, the PLC protocol is a modified IEEE 1901 standard protocol.

At block 504, the communication device decodes the data unit. In an embodiment, decoding involves decoding data that has been redundantly encoded over a plurality of subcarriers as discussed above. In accordance with an embodiment in which the frame control block is encoded in accordance with the IEEE 1901 standard, block 504 includes decoding the redundantly encoded data to recover the frame control block in accordance with the IEEE 1901 standard.

At block 506, the communication device identifies a data type identifier and/or header within the data unit. This data type identifier could include, for example, an identification that the data block includes formatted data conforming to the first communications protocol or an identification that the data block includes formatted data conforming to a second communications protocol. In accordance with an embodiment, this data type identifier is a DT_ IH delimiter type field that is set to an appropriate value to indicate according to which of the first protocol or the second protocol the data is formatted. The header includes, for example, a message identification and/or length identification, as shown in FIG. 3, in an embodiment.

At block 508, the communication device determines whether the data type identifier corresponds to a predetermined value corresponding to data formatted according to the second communication protocol. This predetermined value is, for example, an IEEE 1901 standard reserved value, such as 6 or 7, in an embodiment. If it is determined at block 508 that the identifier corresponds to the predetermined value, then method 500 proceeds to block 510. On the other hand, if it is determined at block 508 that the identifier does not correspond to the predetermined value, the method 500 proceeds to block 514.

At block 510, the communication device extracts and/or formats the data within the data unit in accordance with the second communications protocol. For example, extracting the data within the data unit includes parsing the data within the data unit according to a format specified by the second communication protocol, in an embodiment. Formatting the data includes, for example, inserting start and stop bits in embodiments in which the data start and/or stop bits within the data unit were removed at the transmitter. In some embodiments in which the data within the data unit is already formatted in accordance with the second communications protocol, the formatting is omitted.

At block 512, the communication device processes the data that had been extracted and/or formatted at block 510 in accordance with the second communications protocol. Block 512 includes, for example, processing a LIN or CAN command sent from central node 14, in an embodiment.

At block 514, the communication device processes the data unit in accordance with the first communications protocol. This includes, for example, processing the frame control block in accordance with a PLC protocol, in an embodiment.

In some embodiments, blocks 506, 508, and 514 or portions thereof are omitted. For example, in some embodiments, it is assumed that data in the data units is formatted according to the second communication protocol.

The Figures presented herein are for illustrative purposes. Communications and/or couplings between various elements illustrated throughout the Figures may be performed using any type of coupling or means of communications to accomplish the corresponding operations as described herein. For example, even though single lines are used to illustrate communications between some elements, this communication may be implemented with any number of wires and/or buses. Furthermore, such communications may be implemented with any appropriate communication protocol, such as serial or parallel communications, regardless of the illustrated couplings.

Further aspects of this invention relate to one or more of the following clauses.

In an first embodiment, a method is performed by a communication device and includes receiving a data unit in accordance with a power line communications protocol, extracting data within the data unit to provide extracted data, and processing the extracted data in accordance with a non-power line communication protocol.

Variations of the first and other embodiments include the communication device identifying a data type identifier within the data unit, determining the data type identifier corresponds to a predetermined value, and processing the extracted data in accordance with the non-power line communication protocol when it is determined that the data type identifier corresponds to the predetermined value.

Additional variations of the first and other embodiments include the communication device processing the data unit in accordance with the power line communication protocol when it is determined that the data type identifier does not correspond to the predetermined value.

Further variations of the first and other embodiments include the non-power line communication protocol is a serial network protocol.

Still further variations of the first and other embodiments include the serial network protocol including one or more of: (i) a local interconnect network (LIN) protocol, and (ii) a controller area network (CAN) protocol.

In addition, variations of the first and other embodiments include extracting the data from within a variant field of a frame control block of the data unit.

Furthermore, variations of the first and other embodiments include the data type identifier corresponding to a delimiter type field value within the frame control block, and the predetermined value being one of i) six or ii) seven.

Additionally, variations of the first and other embodiments include the non-power line communication protocol being a local interconnect network (LIN) protocol, and adding start and stop bits to the extracted data.

In a second embodiment, a communication device includes a network interface that is configured to receive a data unit in accordance with a power line communications protocol, extract data within the data unit to provide extracted data, and to process the extracted data in accordance with a non-power line communication protocol.

Variations of the second and other embodiments include the network interface being configured to determine whether a data type identifier in the data unit corresponds to a predetermined value, and processing the extracted data in accordance with the non-power line communication protocol in response to determining that the data type identifier corresponds to the predetermined value.

Furthermore, variations of the second and other embodiments include the network interface being configured to process the data unit in accordance with the power line communication protocol when it is determined that the data type identifier does not correspond to the predetermined value.

In addition, variations of the second and other embodiments include the non-power line communication protocol being a serial network protocol.

Still further, variations of the second and other embodiments include the serial network protocol including one or more of (i) a local interconnect network (LIN) protocol, and (ii) a controller area network (CAN) protocol.

Additionally, variations of the second and other embodiments include the network interface device being further configured to provide the extracted data by extracting data from a frame control block in the data unit.

Further, variations of the second and other embodiments include the data type identifier corresponding to a delimiter type field value within the frame control block, and the network interface device being further configured to determine whether the delimiter type field value is one of i) six or ii) seven.

In addition, variations of the second and other embodiments include the second communication protocol being a local interconnect network (LIN) protocol, and the network interface device being further configured to add start and stop bits to the extracted data.

In a third embodiment, a method performed by a communication device includes formatting data according to a non-power line communication protocol as part of a data unit conforming to a power line communication protocol, redundantly encoding the data unit across a plurality of subcarriers in accordance with the second communication protocol, and transmitting the data unit in accordance with the second communication protocol to another communications device.

Variations of the third and other embodiments include the non-power line communication protocol being a serial network protocol.

Further variations of the third and other embodiments include the serial network protocol being one or more of (i) a local interconnect network (LIN) protocol, (ii) and a controller area network (CAN) protocol.

In addition, variations of the third and other embodiments include the data unit comprising a frame control block, and the formatting comprising including the data conforming to the non-power line communication protocol within a frame control block of the data unit.

Furthermore, variations of the third and other embodiments include setting a delimiter type field value in the data unit to a value indicating the data unit includes data formatted according to the non-power line communication protocol.

Still further, variations of the third and other embodiments include the non-power line communication protocol being a local interconnect network (LIN) protocol, and the act of formatting including removing start and stop bits from the data.

In a fourth embodiment, a communication device includes a network interface configured to format data according to a non-power line communication protocol as part of a data unit conforming to a power line communication protocol, redundantly encode the data unit across a plurality of subcarriers in accordance with the second communication protocol, and transmit the data unit in accordance with the second communication protocol to another communications device.

Variations of the fourth and other embodiments include the non-power line communication protocol being a serial network protocol.

In addition, variations of the fourth and other embodiments include the serial network protocol including one or more of (i) a local interconnect network (LIN) protocol, and (ii) a controller area network (CAN) protocol.

Furthermore, variations of the fourth and other embodiments include the data unit comprising a frame control block, and the act of formatting comprising including the data conforming to the non-power line communication protocol within a frame control block of the data unit.

Additionally, variations of the fourth and other embodiments include setting a delimiter type field value in the data unit to a value indicating the data unit includes data formatted according to the non-power line communication protocol.

Still further, variations of the fourth and other embodiments include the non-power line communication protocol being a local interconnect network (LIN) protocol, and the act of formatting comprising removing start and stop bits from the data.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable storage medium such as on a magnetic disk, an optical disk, in a RAM or ROM or flash memory, tape drive, etc. Likewise, the software or firmware instructions may be delivered to a user or a system via any known or desired delivery method. The software or firmware instructions may include machine readable instructions that, when executed by the processor, cause the processor to perform various acts.

When implemented in hardware, the hardware may comprise one or more of discrete components, an integrated circuit, an ASIC, a programmable logic device (PLD), etc.

While various aspects of the present invention have been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   receiving, by a communication device, a power line communication data unit in accordance with a power line communication protocol;
   identifying, by the communication device, a data type identifier within a frame control block of the data unit;
   determining, by the communication device, whether the data type identifier corresponds to a predetermined value;
   when it is determined that the data type identifier corresponds to the predetermined value,
      determining, by the communication device, that the data unit does not include a payload field after the frame control block, and
      extracting, by the communication device, payload data within the frame control block of the data unit to provide extracted data; and
   processing, by the communication device, the extracted data in accordance with a non-power line communication protocol.

2. The method of claim 1, further comprising:
   when it is determined that the data type identifier does not correspond to the predetermined value, processing, by the communication device, the data unit in accordance with the power line communication protocol.

3. The method of claim 1, wherein the non-power line communication protocol is a serial network protocol.

4. The method of claim 3, wherein the serial network protocol includes one or more of:
   a local interconnect network (LIN) protocol; and
   a controller area network (CAN) protocol.

5. The method of claim 1, wherein the act of extracting comprises:
   extracting the data from within a variant field of the frame control block of the data unit.

6. The method of claim 5, wherein the data type identifier corresponds to a delimiter type field value within the frame control block, and wherein the predetermined value is one of i) six or ii) seven.

7. The method of claim 1, wherein:
   the non-power line communication protocol is a local interconnect network (LIN) protocol; and
   the method further comprises adding start and stop bits to the extracted data.

8. A communication device, comprising:
   a network interface device including:
   one or more integrated circuit devices configured to:
      receive a power line communication data unit in accordance with a power line communication protocol; and
      identify a data type identifier within a frame control block of the data unit;
      determine whether the data type identifier corresponds to a predetermined value;
      when it is determined that the data type identifier corresponds to the predetermined value,
         determine that the data unit does not include a payload field after the frame control block, and
         extract payload data within the frame control block of the data unit to provide extracted data; and
      process the extracted data in accordance with a non-power line communication protocol.

9. The communication device of claim 8, wherein the is one or more integrated circuits are further configured to:
   process the extracted data in accordance with the non-power line communication protocol in response to determining that the data type identifier corresponds to the predetermined value.

10. The communication device of claim 9, wherein the one or more integrated circuits are further configured to:
    process the data unit in accordance with the power line communication protocol when it is determined that the data type identifier does not correspond to the predetermined value.

11. The communication device of claim 8, wherein the non-power line communication protocol is a serial network protocol.

12. The communication device of claim 11, wherein the serial network protocol includes one or more of:
    a local interconnect network (LIN) protocol; and
    a controller area network (CAN) protocol.

13. The communication device of claim 8, wherein the data type identifier corresponds to a delimiter type field value within the frame control block, and wherein the network interface device is further configured to determine whether the delimiter type field value is one of i) six or ii) seven.

14. The communication device of claim 9, wherein the non-power line communication protocol is a local interconnect network (LIN) protocol, and
    wherein the one or more integrated circuits are further configured to add start and stop bits to the extracted data.

15. A method, comprising:
generating, by a communication device, a power line communication data unit for transmission according to a power line communication protocol, comprising:
including a data type identifier within a frame control block of the data unit, wherein the data type identifier is set to a predetermined value,
including payload data within the frame control block, the payload data formatted according to a non-power line communication protocol,
generating the data unit so that the data unit omits a payload field separate from the frame control block, and
redundantly encoding, by the communication device, the frame control block across a plurality of subcarriers; and
transmitting, by the communication device, the data unit in accordance with the power line communication protocol.

16. The method of claim 15, further comprising processing the payload data according to the non-power line communication protocol, which is a serial network protocol.

17. The method of claim 16, wherein the serial network protocol includes one or more of:
a local interconnect network (LIN) protocol; and
a controller area network (CAN) protocol.

18. The method of claim 15, wherein:
the predetermined value of the data type identifier within the frame control block in the data unit indicates the data unit includes data formatted according to the non-power line communication protocol.

19. The method of claim 15, wherein the non-power line communication protocol is a local interconnect network (LIN) protocol, and
wherein the method further comprises removing start and stop bits from the payload data.

20. A communication device, comprising:
a network interface device including:
one or more integrated circuits configured to:
generate a power line communication data unit for transmission according to a power line communication protocol, comprising:
including a data type identifier within a frame control block of the data unit, wherein the data type identifier is set to a predetermined value,
including payload data within the frame control block, the payload data formatted according to a non-power line communication protocol,
generating the data unit so that the data unit omits a payload field separate from the frame control block, and
redundantly encoding the frame control block across a plurality of subcarriers; and
wherein the one or more integrated circuits are further configured to transmit the data unit in accordance with the power line communication protocol.

21. The communication device of claim 20, wherein the one or more integrated circuits are further configured to process the payload data according to the non-power line communication protocol, which is a serial network protocol.

22. The communication device of claim 21, wherein the serial network protocol includes one or more of:
a local interconnect network (LIN) protocol; and
a controller area network (CAN) protocol.

23. The communication device of claim 20, wherein:
the predetermined value of the data type identifier within the frame control block in the data unit indicates the data unit includes data formatted according to the non-power line communication protocol.

24. The communication device of claim 20, wherein the non-power line communication protocol is a local interconnect network (LIN) protocol, and
wherein the one or more integrated circuits are further configured to remove start and stop bits from the payload data.

* * * * *